United States Patent Office 3,428,358
Patented Feb. 18, 1969

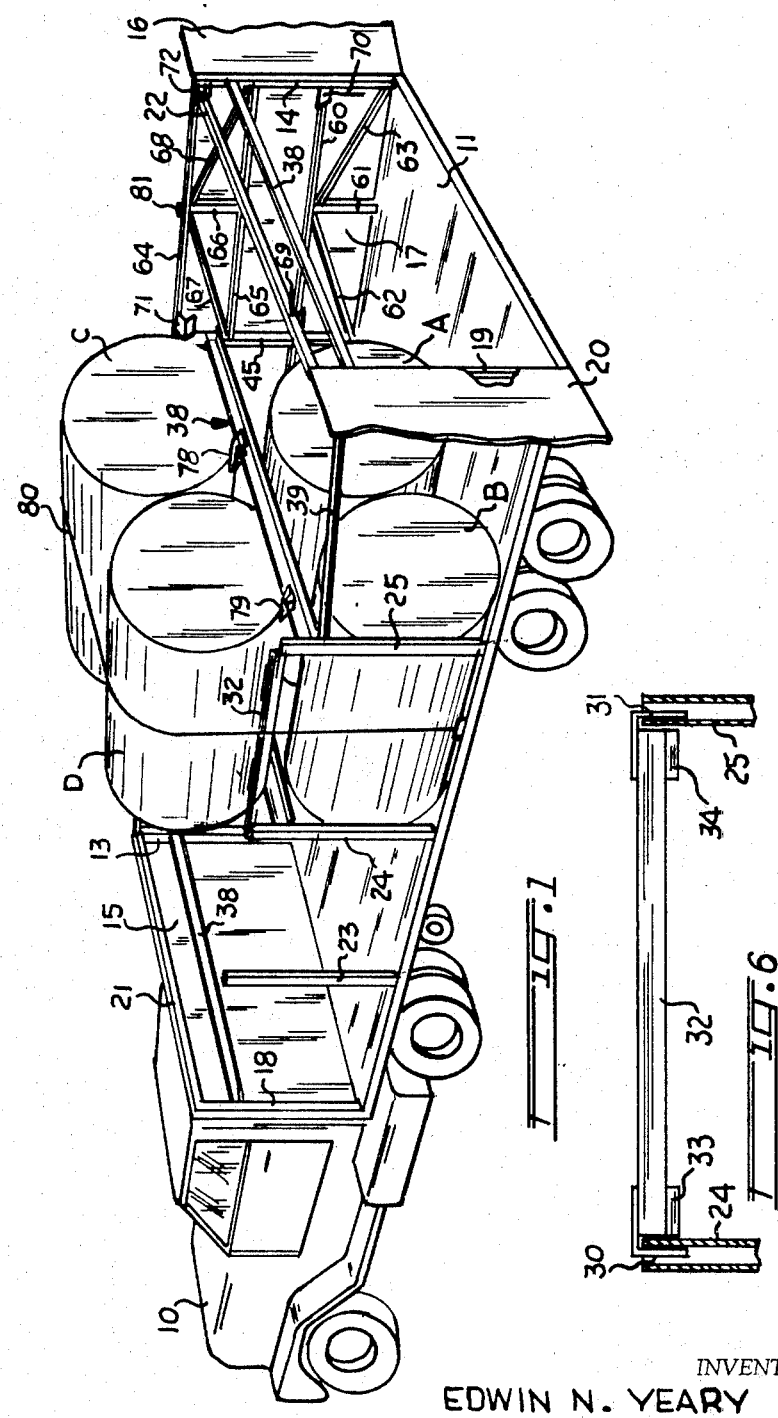

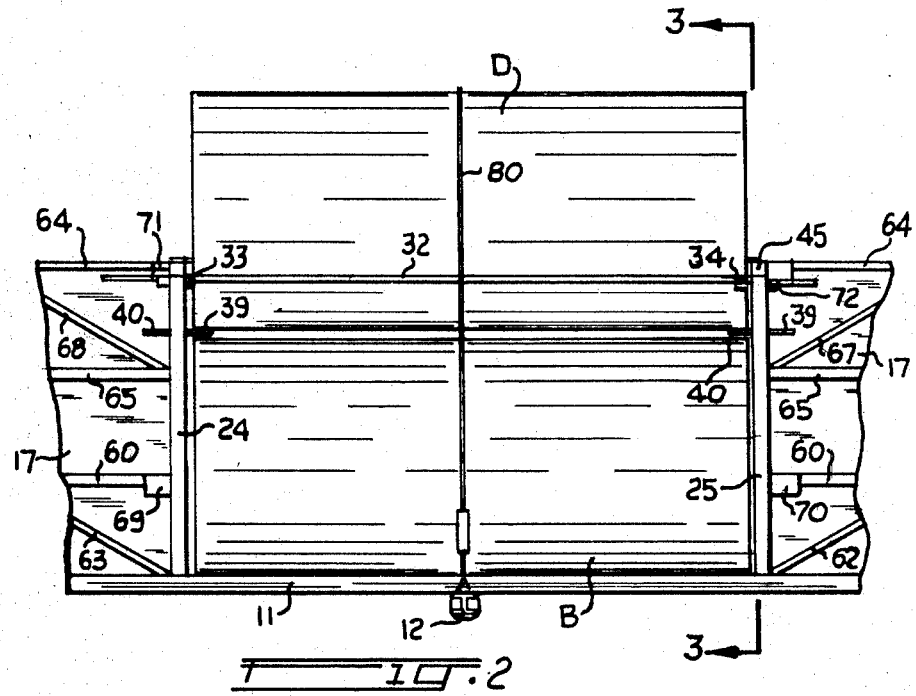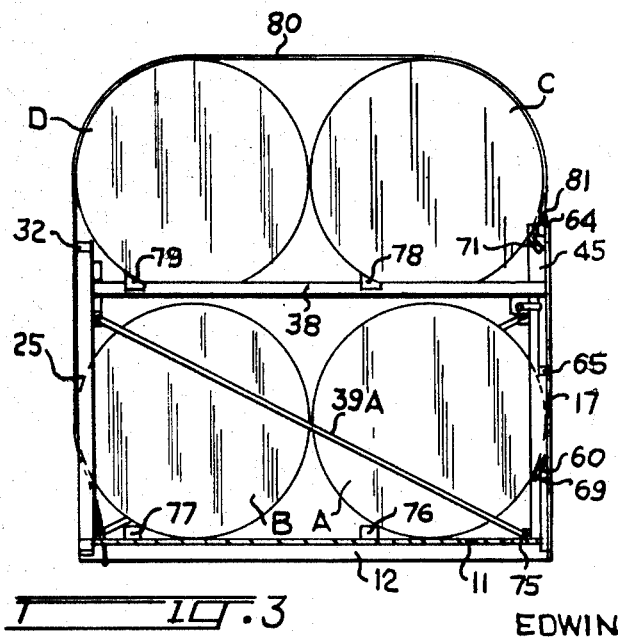

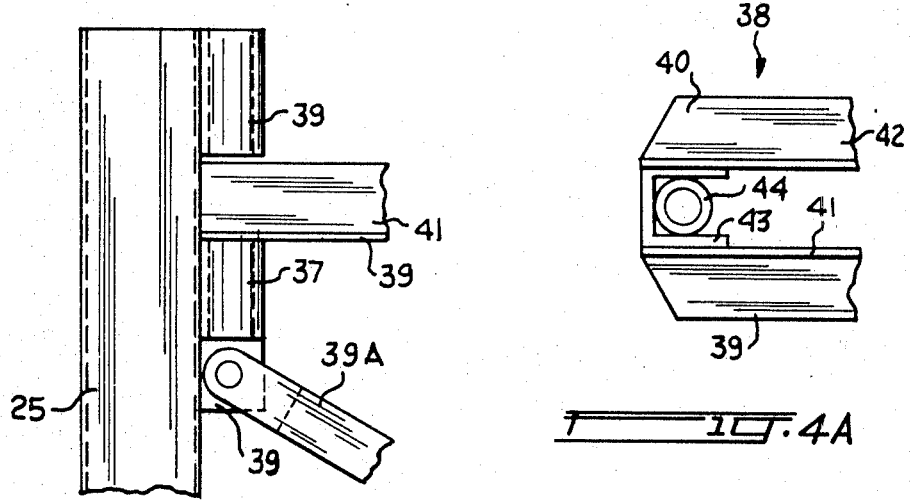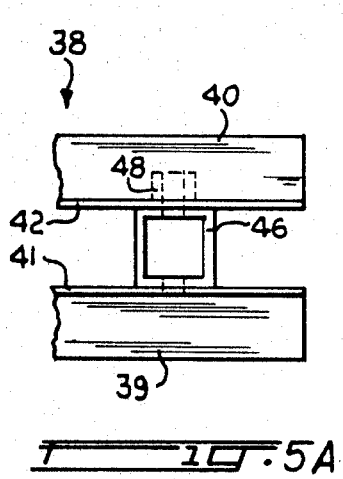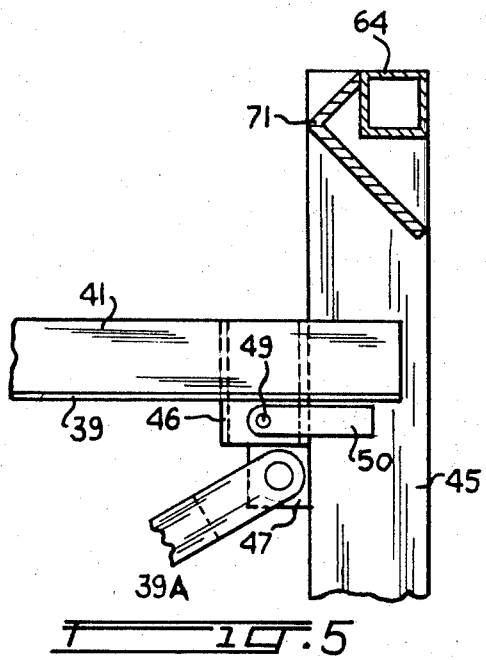

3,428,358
SIDE-LOADING VEHICLE FOR CARRYING ARTICLES IN MULTI-TIER ARRANGEMENT
Edwin N. Yeary, Lexington, Ky., assignor to Sideloading, Inc., Winchester, Ky., a corporation of Kentucky
Filed May 3, 1967, Ser. No. 635,771
U.S. Cl. 296—4       5 Claims
Int. Cl. B60p 7/06; B62d 33/02; B61d 3/08

ABSTRACT OF THE DISCLOSURE

A roofless, side-loading, flat-bed vehicle for carrying articles in multi-tier arrangement. A reinforced superstructure including columns fixed to the flat-bed along one side of the same, includes transverse beams detachably engageable with removable columns located at the opposite side of the flat-bed; the beams serving to support upper-tier articles.

BACKGROUND OF THE INVENTION

Field of the invention

The invention relates to the transportation of, and particularly to the loading and unloading and the safe carrying of, massive articles arranged in multi-tier relation upon a flat-bed vehicle. A superstructure located above the flat-bed is composed of interrelated elements which makes it well suited for carrying loaded tobacco hogsheads or palletized cargoes which are to be loaded and unloaded from one side of the vehicle.

Description of the prior art

Conventional apparatus is illustrated by my earlier Patents No. 3,146,017 and No. 3,224,614 dealing with vehicles wherein articles such as hogsheads are side-loaded and wherein a vehicle having a top providing reinforcement by transverse truss members is shown. However, when such a top is omitted, a problem of providing adequate reinforcement immediately arises and which problem it is a purpose of the present invention to solve.

SUMMARY

The invention relates to a roofless, flat-bed wheeled vehicle adapted for side-loading wherein the superstructure includes side columns between which a plurality of generally horizontal article supporting beams extend and with upper and lower framings at one side of the vehicle attached to adjacent columns on that side. These framings serve to mount positioning pads for the articles carried both in a lower tier on the flat-bed and in an upper tier on the beans. It is a feature of the invention that the pads on the upper framings are located above the beams at a distance less than one-half the distance of the beams above the flat-bed with the result that the bending moment imparted to the columns to which the framings are attached, may be substantially reduced.

It is an object of the invention to provide a suitably reinforced superstructure which will permit the side loading of the vehicle without the loading disadvantages inherent in a roofed vehicle.

BRIEF DESCRIPTION OF THE DRAWINGS

The objects of the invention will be more apparent when considered in conjunction with the following description of the apparatus and with respect to the accompanying drawings wherein FIG. 1 is a perspective view of a vehicle partially loaded with tobacco hogsheads.

FIG. 2 is a side elevation view of the loaded portion of the vehicle shown in FIG. 1.

FIG. 3 is an end elevation view of the hogsheads as taken along line 3—3 of FIG. 2 and with a diagonal brace added.

FIG. 4 is an elevation view of the upper end of one of the removable columns with a beam and a diagonal brace shown in operative relation thereto.

FIG. 4A is a plan view of the end of the beam indicated in FIG. 4.

FIG. 5 is an elevation view of the upper end of one of the fixed columns with a beam and a diagonal brace shown in operative relation thereto.

FIG. 5A is a plan view of the end of the beam indicated in FIG. 5, and

FIG. 6 is a side elevation view of one of the longitudinal braces for the removable columns and showing portions of the tops of the adjacent columns in section.

DESCRIPTION OF THE PREFERRED EMBODIMENT

Referring now to FIG. 1, a partially loaded vehicle embodying the invention and which may be conveniently loaded and unloaded from one side by the use of fork lift trucks, is shown. This vehicle may comprise a conventional trailer-tractor combination with the tractor 10 being detachably connected in the usual way to the trailer which has a flat-bed 11 with transverse floor stringers 12 on the underside thereof. Rigidly affixed at their lower ends to the flat-bed and stringers along one side of the trailer is a series of spaced first vertical columns, the forwardmost such column 13 and the rearmost such column 14 respectively providing support for a relatively low front wall 15 and a relatively low rear door section 16. Preferably, but not necessarily, the outer surface of the first columns serve to support a thin wall 17.

Rigidly affixed at their lower ends to the flat-bed and to the stringers along the opposite side of the trailer are a front second column 18 and a rear second column 19 respectively providing support for the front wall 15 and a door section 20. These second columns preferably are of the same height as the first columns. The upper ends of columns 13 and 18 are rigidly interconnected by a brace 21 and the upper ends of columns 14 and 19 are similarly interconnected by brace 22. Spaced between the columns 18 and 19 and detachably secured in any suitable manner at their lower ends to the flat-bed is a series of third columns here shown at 23, 24, 25 and whose height is less than that of the other columns. As best seen in FIG. 6, these columns are open at their upper ends and are adapted to receive removably therein with a close fit the depending projections 30, 31 at the ends of a longitudinal reinforcement spacer 32. Affixed to this spacer at distances from the projections corresponding generally to the wall thickness of the third columns such as indicated at 24, 25, are blocks 33, 34 adapted to abut against the outer faces of the corresponding columns which preferably are rectangular in cross section. Bracket means (not shown) are attached to columns 18 and 19 for receiving the ends of the spacers connecting these columns respectively to the adjacent third columns.

Referring now to FIGS. 4 and 4A, the upper end of each of the third columns is provided with a pair of vertically spaced bosses 36, 37 rigidly affixed thereto on the inner face thereof and having bores into which a vertically extending pin (not shown) may be detachably inserted. Beneath the lower boss 37 a block 38 is rigidly affixed to the column and includes a horizontal bore into which a pin (not shown) may be detachably inserted to fasten a diagonal brace 39A for a purpose later to appear. Insertable between the bosses 36, 37 is one end of a load-bearing beam generally indicated at 38 and adapted for supporting the ends of articles disposed in upper-tier relation on the vehicle. This beam includes rail portions 39, 40 with upwardly extending flanges 41, 42 suitably separated by a spacing channel-like member 43 in which a short tubular section 44 is mounted for receiving the pin securing this end of the beam to column 25, the confronting face of the channel member being adapted to abut against the inner face of the column and the ends of the rail portions being located in non-embracing relation to the sides of the column.

The corresponding first column 45 to which the other end of beam 38 is to be detachably secured includes a rectangular cross section to the outer face of which the side wall 17 may be affixed and against the inner face of which the spacer 46 secured between the flanges 41, 42 of the beam, may abut. This spacer projects downwardly from the beam and its lower end rests upon a block 47 rigidly affixed to the inner face of the column 45, as shown in FIG. 5. Projecting from one side of the lower part of the spacer beneath the rail 40 is an apertured block 48 adapted to detachably receive a pin (not shown) which may be passed through the bore 49 of a bracket 50 affixed to one side of column 45 when the bifurcated end of the beam 38 is in embracing relation to the sides of that column. Also, the block 47 is provided with a horizontal bore into which a pin (not shown) may be detachably secured in order to mount the diagonal brace 39.

When employing the thus far described superstructure for transportation of loaded tobacco hogsheads the following example of suitable dimensions will serve to illustrate certain features of the invention. Such hogsheads are about 48 inches in diameter, weigh about 800–1000 pounds when loaded, and in one presently used vehicle with eight bays, a total of 32 hogsheads can be carried at one time. As will be apparent, if the fixed first columns were to contact the hogsheads tangentially to their circumferences, the mass of the upper tiers of such hogsheads would impose a large bending moment about the points at which such columns are affixed to the flat-bed and to the floor stringers. Bracing between the fixed first columns is thus indicated, but in order to employ the hogsheads side by side and not exceed the road limitations imposed by the authorities on this type of vehicle, such bracing must not reduce the carrying space of the vehicle for this type of articles. I now have discovered that by utilizing upper and lower truss type framings spaced from each other and interconnecting adjacent first columns and by limiting the height at which the upper tier hogshead contacts the fixed column, these difficulties may be overcome. In general, it has been found that if the vertical distance between the point of contact of an upper hogshead with the fixed superstructure and the rails of the transverse beams is less than half the vertical distance between those rails and the flat-bed of the vehicle, a satisfactory arrangement results. Preferably, the distance between the rails and the positioning pads later to be described, is about eight inches.

As best seen in FIG. 1, a lower framing including a hollow strut 60 is rigidly secured at its ends to the adjacent first columns 14, 45 and a vertical central strut 61 joins the strut 60 to the flat-bed. Diagonal struts 62, 63 further assist in reinforcing the structure. Similiarly, an upper framing including a top strut 64 and a bottom strut 65 join the respective first columns and are in turn joined by the central vertical strut 66 and diagonal struts 67, 68. As will be noted, the spacing between the strut 60 of the lower framing and the bottom strut 65 of the upper framing is such that the circumference of the hogshead in the lower tier can rest closely adjacent the wall 17 of the vehicle. In order to position this hogshead properly, suitable pads 69, 70 are affixed to a strut or to a column or to both, and against which pad the hogshead is held in contact. Similarly, suitable upper pads, 71, 72 are affixed to the columns and to the top strut 64 of the upper framing. Corresponding framings and pads are, of course, employed in each of the bays of the vehicle.

As will be understood, the forwardmost beam 38 in the front bay adjacent the front wall 15 and the rearmost beam 38 in the rear bay adjacent the door are suitably modified to suit their particular locations. They may remain fixed to the corresponding columns and will require only a single rail and a single flange. Moreover, the respective columns may be provided with apertured blocks, one of which is shown at 75 in FIG. 3, located near their lower ends at the flat-bed and into which pins (not shown) may be detachably inserted in order to fasten the respective diagonal braces. In general, I prefer to alternate the slopes of the respective braces for securing a more uniform reinforcement.

With the foregoing in mind and referring now to FIGS. 1 to 3, in loading the vehicle with hogsheads the operator by means of a fork lift truck, hoist, or other suitable means positions article A at the open side of the vehicle and permits it to roll between the columns until it rests against pads 69, 70. Thereafter, a suitable chock 76 is secured in place on floor 11 and article B is rolled into place and secured by chock 77. A diagonal brace 39A may then be secured in place. Normally, the loading progresses from the forward bay to the rearmost bay, but for simplicity in FIG. 1 only one bay is shown loaded.

After loading the lower tier the operator then elevates article C and permits it to roll along the rails of beams 38 until it rests against pads 71, 72 and then secures in place upon the beams a pair of suitable detachable chocks 78 which may be of the type disclosed in Patent 3,146,017. Thereafter, the next article D is arranged in place upon the beams and secured by another pair of detachable chocks 79. A cable 80 anchored at one end upon a ring 81 attached to the upper framing at the far side of the vehicle is then extended over the mid-sections of articles C and D and secured to the stringer 12 under the flat-bed. This cable also contacts the mid-section of article B and passes outboard of the spacer 32 which is emplaced before the cable is secured. As seen in FIG. 1 only one spacer 32 is shown in place, but it will be understood that in actual usage each of the adjacent columns on this side of the vehicle will be connected by such spacers before the vehicle takes to the road. Also the spacer 32, due to the lower heights of the detachable third columns, will not be in contact with the upper tier article D.

Due to the several reinforcing features, the described superstructure can safely carry heavy loadings and at the same time the loading disadvantages inherent in a roofed vehicle are obviated. For example, after repeated usage tobacco hogsheads may become somewhat deformed in shape and in order to be deposited on the rails of the beams may have to be lowered rather than rolled into place. In the absence of a roof, the operator consequently can manipulate his loading equipment with greater efficiency when handling this type of article. It will be understood moreover that the invention is not limited to use with cylindrical articles and may be employed with pallet-loaded cargo of any appropriate shapes in which the several positioning pads serve a function equivalent to that herein described with respect to hogsheads. By selective removal and emplacement of the detachable third columns and detachable beams, the basic vehicle may also be employed for general purpose cargo, if desired, and loading trucks can move on the flat bed during loading and unloading operations.

A further advantage is found when the cargo needs to be transported in covered condition. When employing the side wall 17, front wall 15 and closed doors 16, 20, a conventional cover, not shown, may be fastened at one edge along the upper struts 64 and after the cargo is secured in place in the several bays, such cover may be drawn over the loaded vehicle and fastened along the lower edge of the second side of the flat-bed. Due to the relatively low size of the front wall and doors, a tightly packaged covered load is thus prepared for transit.

Having thus described by invention by reference to one preferred embodiment of the same, it will be understood

What is claimed is:

1. In a roofless, flat-bed, wheeled vehicle adapted for side-loading and for carrying articles in multi-tier arrangement, the improvement comprising a plurality of first vertical columns spaced along a first side of said flat-bed and rigidly affixed at their lower ends thereto, front and rear second columns of substantially the same height as said first columns and rigidly affixed at their lower ends to said flat-bed at a second side thereof, a plurality of spaced third columns of less height than said first and second columns detachably mounted at their lower ends upon said flat-bed along said second side thereof, a plurality of generally horizontal beams extending transversely of said flat-bed and detachably anchored at their respective ends upon the corresponding columns at the sides of said flat-bed and at a substantial distance above said flat-bed, each of said beams having a rail portion adapted to support one end of an article resting in upper tier relation on said vehicle and with its other end resting upon the confronting rail portion of the adjacent beam, a lower framing extending between adjacent first columns adjacent said flat-bed, an upper framing spaced from said lower framing and extending between adjacent first columns near the upper ends thereof, a plurality of lower pad members attached to the respective lower framings and adapted to position an article resting in lower tier arrangement upon said flat-bed, and a plurality of upper pad members attached to the respective upper framings and adapted to position an article resting in upper tier arrangement upon said beams, the elevation of said upper pad members above said beams being less than one-half the vertical spacing of said beams above said flat-bed.

2. Apparatus as described in claim 1 including a front wall mounted upon the forwardmost first and second columns, a door extending between the rearwardmost first and second columns, and a sidewall affixed to said first columns and extending between said front wall and said door.

3. Apparatus as defined in claim 2 wherein each of said front wall, side wall and door have less height than the articles carried upon said beams.

4. In a roofless, flat-bed, wheeled vehicle having a plurality of loading bays and adapted for side-loading and for carrying articles in multi-tier arrangement, the improvement comprising a reinforced superstructure including a plurality of first vertical columns spaced along a first side of said flat-bed and rigidly affixed thereto at their lower ends, front and rear second columns of substantially the same height as said first columns and rigidly affixed at their lower ends to said flat-bed at a second side thereof, a plurality of spaced third columns of less height than said first and second columns detachably mounted at their lower ends upon said flat-bed along said second side thereof, a plurality of generally horizontal beams extending transversely of said flat-bed and detachably anchored at their respective ends upon the corresponding columns at the sides of said flat-bed and at a substantial distance above said flat-bed, each of said beams having a rail portion adapted to support one end of an article resting in upper tier relation on said vehicle and with its other end resting upon the confronting rail portion of the adjacent beam, transverse braces joining the respective forwardmost and respective rearwardmost first and second columns adjacent the tops of those columns, a plurality of detachable longitudinally extending spacers joining the adjacent columns at the second side of said flat-bed, and a plurality of diagonal braces extending between corresponding columns at the first and second sides of said flat-bed and detachably joined thereto, said longitudinal spacers and said diagonal braces being adapted for successive emplacement following the loading of successive bays of said vehicle.

5. Apparatus as defined in claim 4 wherein said spacers join the adjacent third columns at the tops of said third columns and at an elevation lower than the tops of said first and second columns.

References Cited

UNITED STATES PATENTS 3,091,193   5/1963   Thomas ---------- 296—43 X
1,482,093   1/1924   Rindesbacher ------ 296—43 X PHILIP GOODMAN, *Primary Examiner.*

U.S. Cl. X.R.

296—43; 105—382